Aug. 14, 1928.
J. C. GARNER
1,680,978
COTTON CLEANING APPARATUS
Filed Oct. 13, 1927     4 Sheets-Sheet 4
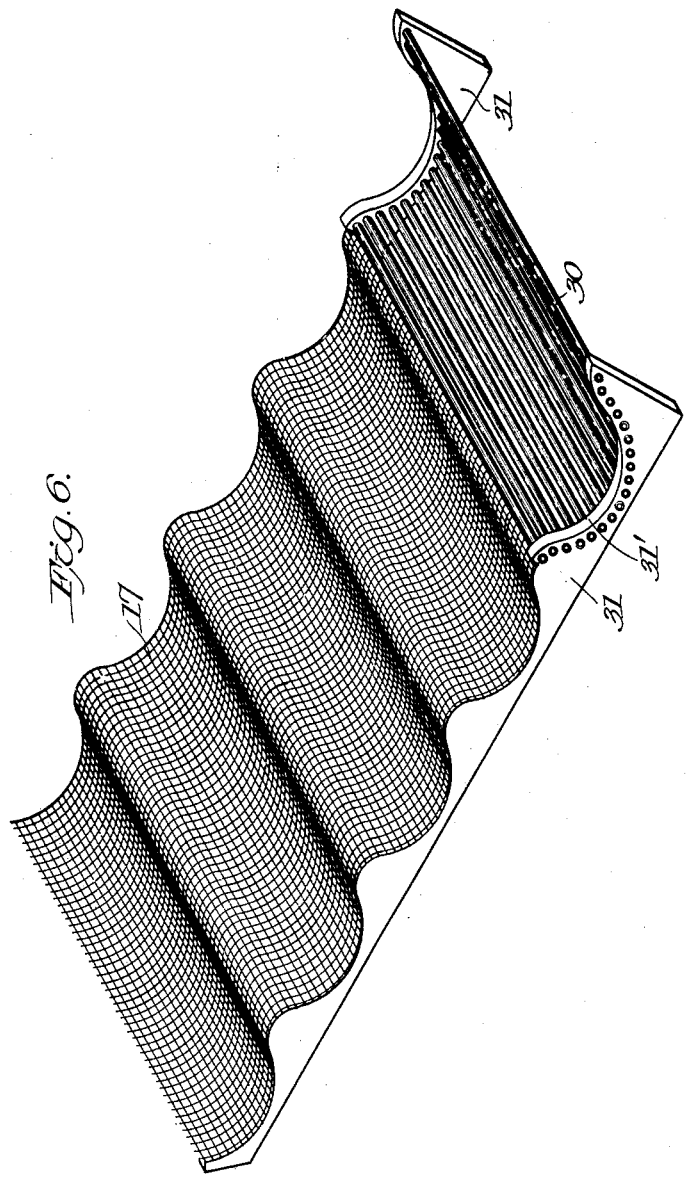

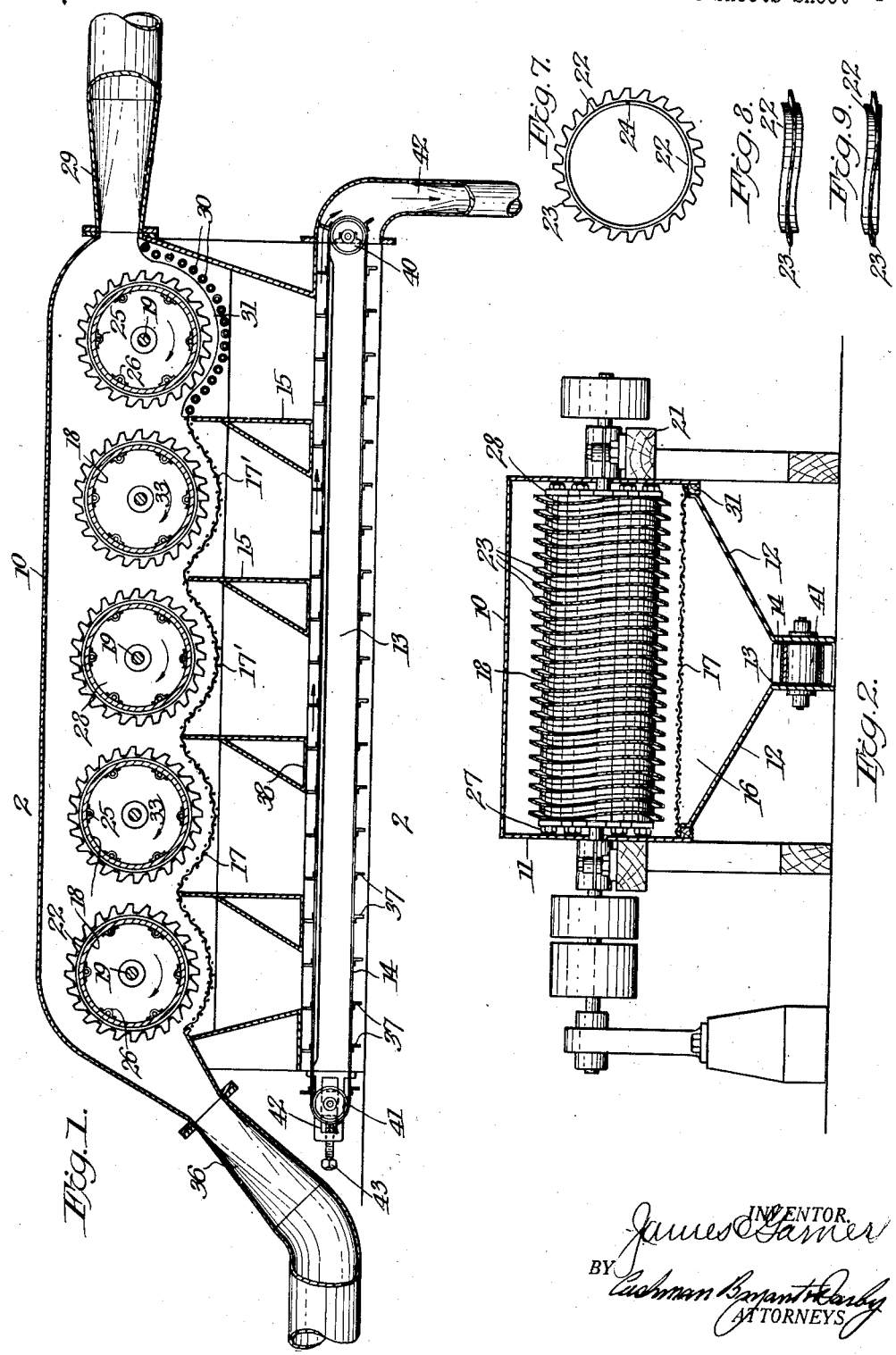

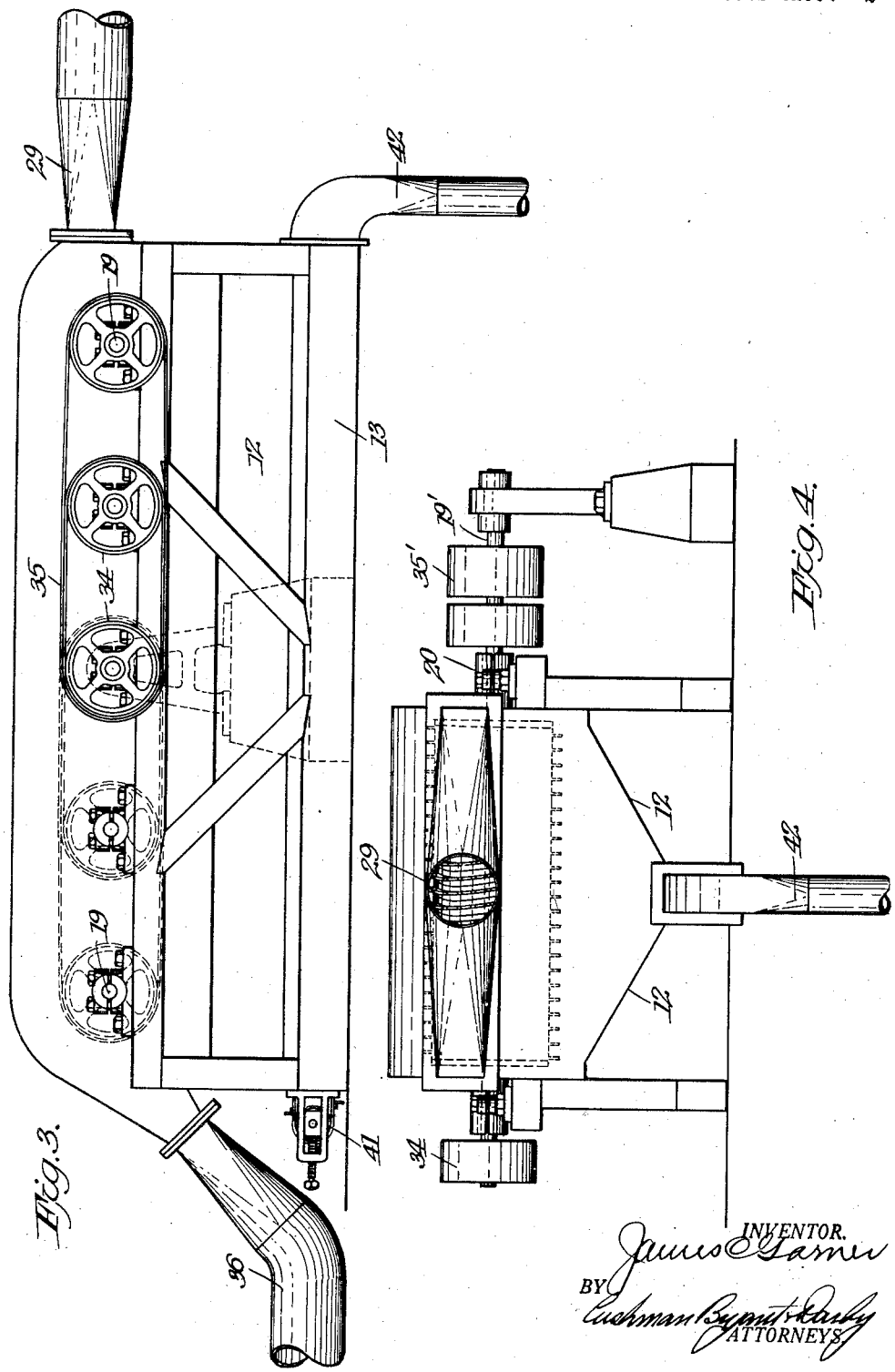

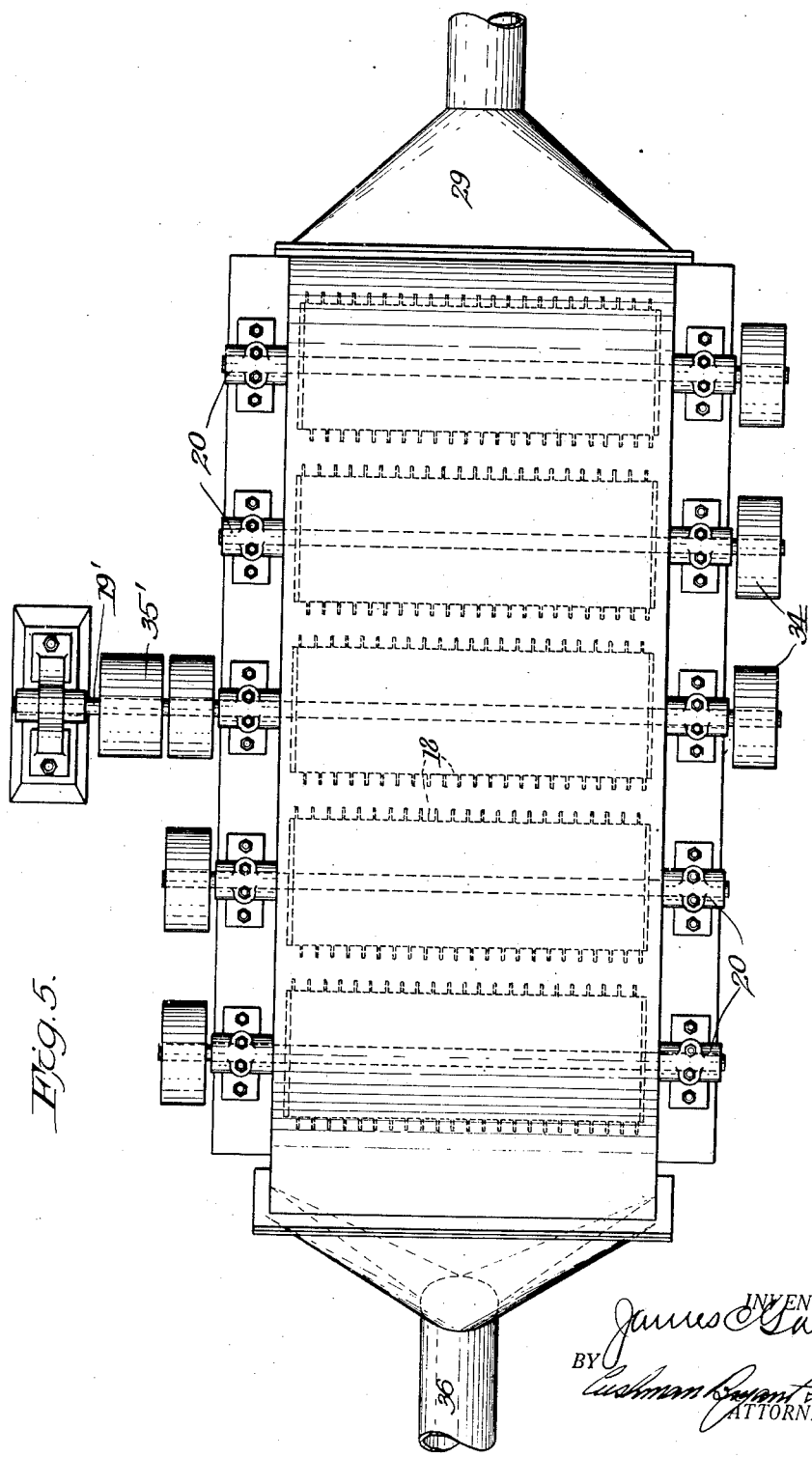

Patented Aug. 14, 1928.

1,680,978

UNITED STATES PATENT OFFICE.

JAMES C. GARNER, OF HOUSTON, TEXAS.

COTTON-CLEANING APPARATUS.

Application filed October 13, 1927. Serial No. 226,021.

The present invention relates to new and useful improvements in machines for treating cotton and similar fibrous materials.

An object of the invention is to provide a machine of this character which is especially adapted for separating lint cotton from the cotton seed, and also for separating the bolls, stems, motes and other foreign matter from the lint, and for collecting said lint and foreign matter separately.

The invention relates to a machine intended primarily for use in connection with cotton before it reaches the gin as by incorporating the same in the air line leading from the wagon to a battery of gins. The machine is also useful in connection with reginning of low grade cotton, which includes dirt and other foreign matter.

The invention comprises broadly a casing structure of considerable longitudinal extent having at one end an inlet and at the other end an outlet between which the cotton is passed through the casing as by means of a suction. The casing is divided substantially horizontally by means of a screening bed which has a plurality of concave portions, each associated with suitable instrumentalities, such as saw drums driven from any suitable source. Dirt, burrs, motes and other foreign matter in the cotton are separated from the cotton by the drums, and passed through the screening bed, while the lint cotton passes onwardly and after treatment by successive drums continues through the outlet to further treating mechanism. The space in the chamber beneath the bed is divided by a plurality of spaced partitions into a series of compartments, the bottoms of which are closed by means of an endless conveyor which serves also to separate the compartments from one another, this is preferably accomplished by providing at the lower ends of the partitions a horizontal wall fitting closely against the conveyor flights, with each wall adapted to overlie the entire space between each pair of flights, so that as the conveyor travels, there is no communication at the lower ends of the partitions between the various compartments. This conveyor serves to remove from the compartments the collected dirt which gravitates to the conveyor from the screening bed thereabove, and thus the compartments are automatically emptied as the machine operates upon the cotton.

Referring to the accompanying drawings wherein there is shown a preferred embodiment of the mechanism:

Figure 1 is a longitudinal sectional view.

Figure 2 is a vertical sectional view taken through Figure 1.

Figure 3 is a side elevational view.

Figure 4 is an end elevational view at the inlet end.

Figure 5 is a top plan view, and

Figure 6 is a perspective of the screening bed removed from the machine.

Figures 7, 8 and 9 are detail views of the toothed rings upon the saw drums.

Referring to the drawings for a more detailed description, 10 indicates the top of a casing having depending side walls 11 and a bottom having downwardly converging portions 12 spaced apart at their lower ends to provide the channel 13 within which travels an endless conveyor 14 driven in any suitable manner (not shown). Above the conveyor are arranged a plurality of substantially upright partitions 15 spaced apart to form therebetween compartments 16 which are arranged below a screening bed 17. The screening bed is adapted to cooperate with suitable cotton treating instrumentalities, such as the drums 18, mounted on transverse shafts 19 which have bearings 20 in the frame 21. Each drum has a series of rings 22 thereon, the rings being formed with saw teeth 23 and being transversely distorted, as illustrated in Figures 8 and 9. Each ring is formed preferably from a T-bar, which is bent to the circular formation illustrated in Figure 7, and after its ends are welded as at 24, the teeth are cut in the outstanding leg or rib thereof. The transverse deflection, which provides a sinuous formation, is used preferably after the cutting of the teeth, although this may be done, if desired, before the teeth are formed. The rings are arranged side by side on each drum, as illustrated in Figure 2, and may be held against separation or movement longitudinally of the drum by means of tie rods 25 extending through eyes 26, within the drum, and carrying end nuts 27 adapted to clamp the drum heads 28 against the end toothed rings. Each drum is adapted to cooperate with a concave portion 17' of the screening bed, and the initial concave adjacent the inlet 29 is formed by a plurality of bars 30 slightly spaced apart and secured at their ends in the side strips 31 of the frame which have concaved upper edges 31' conforming to the shape of the screening bed. The bars 30 provide an initial screening bed portion of substantial strength which is adapted to withstand rough usage, the bars being spaced apart in a manner to prevent lint cotton from passing therebetween but to provide sufficiently large openings to permit dirt, trash and foreign matter to pass through the bed. The succeeding concave portions of the bed may be formed by wire screening or perforated sheet metal having openings therein of suitable size. The saw drums are driven in the direction of the arrows 33 (Figure 1) through pulleys 34 and belts 35, which are actuated by means of a driving pulley 35' upon which extension 19' of the center drum shaft, as illustrated in Figs. 3 and 5 is mounted.

As will be understood, cotton entering the intake 29 under the influence of suction is engaged by the rotating saw drums, and as the dirt, motes and other foreign matter passes downwardly into the compartments 16, the lint cotton continues past each of the drums to the outlet 36.

It will be noted that the partitions 15 extend upwardly between the drums above the drum bottom surfaces, whereby to obstruct the passage of air currents beneath the drums from the inlet 29 to the outlet 36. Consequently, no drafts or eddy currents may be formed beneath the drums which would tend to lift the settling dust and other foreign matter in the compartments.

The foreign matter collected in the various compartments will not be carried upwardly by the suction above the screening bed due to the fact that their lower ends are closed by the bottom 12 and the conveyor 13. The conveyor, which may be driven in any suitable manner (not shown) is provided with a plurality of spaced flights 37 which pass closely beneath horizontally extending walls 38 at the lower ends of the partitions 15, the walls 38 being preferably of sufficient width to cover entirely the space between any pair of flights, thus preventing the passage of air between the compartments as the conveyor travels over its sheaves 40, 41, the latter being adjustable in its bearing 42 by means of an adjusting screw 43 to take up slack in the conveyor. As the conveyor travels, it removes from each compartment the collected foreign matter therein, and the same is discharged through a downwardly directed chute 42. Due to the closing of the lower ends of the compartment 16, the strong suction between the intake 29 and outlet 36 will be confined to the area of the compartment above the screening bed, and will not create upwardly directed drafts in the compartment 16.

Obviously, the invention is not limited to the details of construction described, and numerous modifications may be made therein without departing from the essence of the invention, which is set forth in the following claims.

I claim:

1. A machine of the class described comprising a screening bed having cotton separating instrumentalities thereabove, a casing enclosing said instrumentalities and having inlet and outlet ports at opposite ends of the bed, a plurality of spaced partitions beneath said bed disposed at an angle thereto whereby to form a plurality of compartments, and conveyor means forming movable bottoms for said compartments.

2. A machine of the class described comprising a screening bed having cotton separating instrumentalities thereabove, a casing enclosing said instrumentalities and having inlet and outlet ports at opposite ends of the bed, a plurality of spaced partitions beneath said bed disposed at an angle thereto whereby to form a plurality of compartments, and conveyor means forming a movable closed bottom for said compartment.

3. A machine of the class described comprising a screening bed having cotton saparating instrumentalities thereabove, a casing enclosing said instrumentalities and having inlet and outlet ports at opposite ends of the bed, a plurality of spaced partitions beneath said bed disposed at an angle thereto whereby to form a plurality of compartments, a conveyor extending beneath said compartments and forming a movable bottom therefor.

4. A machine of the class described comprising a screening bed having cotton agitating instrumentalities thereabove, a casing enclosing said instrumentalities and having inlet and outlet ports at opposite ends of the bed, a plurality of separating partitions beneath said bed disposed at an angle thereto whereby to form a plurality of compartments, a conveyor extending beneath said compartments and forming a movable closed bottom therefor.

5. A machine of the class described comprising a screening bed having cotton agitating instrumentalities thereabove, a casing enclosing said instrumentalities and having inlet and outlet ports at opposite ends of the bed, a plurality of spaced partitions beneath said bed disposed at an angle thereto whereby to form a plurality of compartments, a conveyor extending beneath said compartments and forming a movable bottom therefor, said conveyor having a plurality of flights, and means adapted to fit closely against said flights and the conveyor, whereby the conveyor closes the bottoms of said compartments.

6. A machine of the class described comprising a screening bed having cotton agitating instrumentalities thereabove, a casing enclosing said instrumentalities and having inlet and outlet ports at opposite ends of the bed, a plurality of spaced partitions beneath said bed disposed at an angle thereto whereby to form a plurality of compartments, a conveyor extending beneath said compartments and forming a movable bottom therefor, said conveyor having a plurality of flights, and means adapted to fit closely against said flights and the conveyor, whereby the conveyor closes the bottoms of said compartments and the latter are closed at their bottoms from one another.

7. A machine of the class described comprising a screening bed having cotton agitating instrumentalities thereabove, a casing enclosing said instrumentalities and having inlet and outlet ports at opposite ends of the bed, a plurality of spaced partitions beneath said bed disposed at an angle thereto whereby to form a plurality of compartments, a conveyor extending beneath said compartments and forming a movable bottom therefor, said conveyor having a plurality of flights, and means adapted to fit closely against said flights and the conveyor, whereby the conveyor closes the bottoms of said compartments and the latter are closed at their bottoms from one another, said means comprising a substantially horizontal wall at the lower ends of said partitions adapted to overlie the entire space between any pair of flights.

8. A machine of the class described comprising a screening bed having a plurality of concave portions, rotary saw drums above said portions, a casing enclosing said drums and having inlet and outlet ports at opposite ends of the bed, a plurality of spaced partitions beneath said bed disposed at an angle thereto whereby to form a plurality of compartments, and conveyor means forming movable bottoms for said compartments.

9. A machine of the class described comprising a screening bed having a plurality of concave portions, rotary saw drums above said portions, a casing enclosing said drums and having inlet and outlet ports at opposite ends of the bed, a plurality of spaced partitions beneath said bed disposed at an angle thereto whereby to form a plurality of compartments, and conveyor means forming a movable closed bottom for said compartment.

10. A machine of the class described comprising a screening bed having a plurality of concave portions, rotary saw drums above said portions, a casing enclosing said drums and having inlet and outlet ports at opposite ends of the bed, a plurality of spaced partitions beneath said bed disposed at an angle thereto whereby to form a plurality of compartments and a conveyor extending beneath said compartments and forming a movable closed bottom therefor.

11. A machine of the class described comprising a screening bed having a plurality of concave portions, rotary saw drums above said portions, a casing enclosing said drums and having inlet and outlet ports at opposite ends of the bed, a plurality of spaced partitions beneath said bed disposed at an angle thereto whereby to form a plurality of compartments, a conveyor extending beneath said compartments and forming a movable bottom therefor, said conveyor having a plurality of flights, and means adapted to fit closely against said flights and the conveyor, whereby to close the conveyor closes the bottom of said compartments.

12. A machine of the class described comprising a screening bed having a plurality of concave portions, rotary saw drums above said portions, a casing enclosing said drums and having inlet and outlet ports at opposite ends of the bed, a plurality of spaced partitions beneath said bed disposed at an angle thereto whereby to form a plurality of compartments, a conveyor extending beneath said compartments, and forming a movable bottom therefor, said conveyor having a plurality of flights and means adapted to fit closely against said flights and the conveyor, whereby to close the conveyor closes the bottoms of said compartments and the latter are closed at their bottoms from one another.

13. A machine of the class described comprising a screening bed having cotton separating instrumentalities thereabove, a casing enclosing said instrumentalities and having inlet and outlet ports at opposite ends of the bed, a plurality of spaced partitions beneath said bed disposed at an angle thereto whereby to form a plurality of compartments, said compartments having closed bottoms and the partitions extending upwardly between said instrumentalities above the planes of their bottoms, whereby to close the space above said screening bed and beneath said instrumentalities longitudinally of said casing and obstruct the passage of eddy currents through the casing beneath said instrumentalities.

14. A machine of the class described comprising a screening bed having a plurality of concave portions, rotary saw drums above said portions, a casing enclosing said drums and having inlet and outlet ports at opposite ends of the bed, a plurality of spaced partitions beneath said bed disposed at an angle thereto whereby to form a plurality of compartments and a conveyor extending beneath said compartments and forming a movable closed bottom therefor, said partitions extending upwardly between said drums above the planes of their bottoms, whereby to obstruct the passage of air currents through the casing beneath said drums.

In testimony whereof I have hereunto set my hand.

JAMES C. GARNER.